(12) United States Patent
Egan et al.

(10) Patent No.: US 7,545,119 B1
(45) Date of Patent: Jun. 9, 2009

(54) SENSOR INCORPORATED INTO ENERGY STORAGE DEVICE PACKAGE

(75) Inventors: Patrick Kevin Egan, Rochester, MN (US); Richard John Fishbune, Rochester, MN (US); Brian Joseph Hruby, Rochester, MN (US); Michale Lee Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/184,111

(22) Filed: Jul. 31, 2008

(51) Int. Cl.
  *H02J 7/00* (2006.01)
(52) U.S. Cl. .................................... 320/136
(58) Field of Classification Search ................ 320/136
  See application file for complete search history.

(56) References Cited

U.S. PATENT DOCUMENTS

| | | | |
|---|---|---|---|
| 5,034,848 A | | 7/1991 | Rowlette |
| 5,438,249 A | * | 8/1995 | Chang et al. ............ 320/127 |
| 6,891,353 B2 | | 5/2005 | Tsukamoto |
| 2003/0027036 A1 | | 2/2003 | Emori |

FOREIGN PATENT DOCUMENTS

EP   1 113 252   7/2001

* cited by examiner

*Primary Examiner*—Akm E Ullah
*Assistant Examiner*—Samuel Berhanu
(74) *Attorney, Agent, or Firm*—McGinn IP Law Group, PLLC

(57) ABSTRACT

A method of preventing an energy storage device failure in a power supply, includes a package deformation, indicating a gas buildup and a forthcoming failure in a package wall of the energy storage device is detected. A voltage caused by the displacement of the package wall of the energy storage device is detected. It is determined whether the detected voltage is greater than or equal to a voltage threshold to indicate a slight package deformation. A warning is issued if the detected voltage is greater than or equal to the voltage threshold for the slight package deformation. It is determined whether the detected voltage is greater than or equal to a voltage threshold, to indicate a package deformation severe enough that a package breach is imminent. The power supply is shut down if the detected voltage is determined to be greater than or equal to the package breach voltage threshold.

1 Claim, 7 Drawing Sheets

Fig. 7
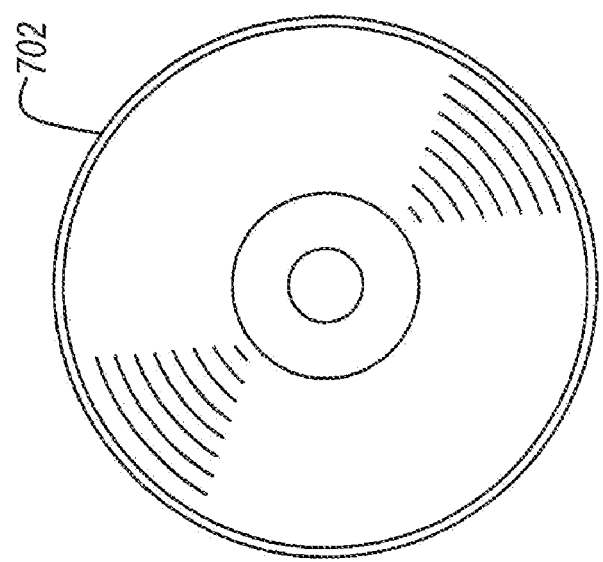
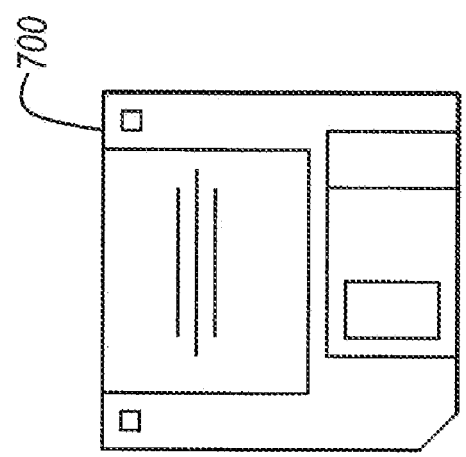

SENSOR INCORPORATED INTO ENERGY STORAGE DEVICE PACKAGE

BACKGROUND OF THE INVENTION

1. Field of the Invention

The present invention generally relates to a method and apparatus for sensing a condition of a power supply, and more particularly to sensing a failure of an energy storage device such as an electrolytic capacitor or battery.

2. Description of the Related Art

Modern information technology equipment requires extremely reliable power supplies. These power supplies utilize large electrolytic capacitors as energy storage devices, which are rated for upwards of hundreds of microfarads at hundreds of volts. These power supplies are designed to operate the capacitor well within its margin, and are indicated to have a certain operating life. However, environmental and operating conditions could lead to the capacitor operating outside of its margins, resulting in a premature failure.

The conventional method of containing a capacitor failure is to create structurally weaker parts of the capacitor package, which allow the capacitor to vent (i.e., vent smoke) rather than explode. However, failure of these conventional capacitors still results in a non-functional power supply, coinciding with a smoke event and leakage of electrolyte.

These power supplies, or AC-DC converters, employ a boost topology that converts the AC input to high-voltage DC which is then converted into the desired DC output.

An electrolytic capacitor is a component that has a limited life span. As it deteriorates, the capacitor may experience one of several failure modes. Some of these failure modes result in heating of the electrolyte, which causes hydrogen gas to be formed, which in turn creates a buildup of pressure internal to the capacitor. When the pressure is too great to be contained within the capacitor, the package vents through its pressure relief structure to prevent an explosion. FIG. 1 illustrates a conventional capacitor 100. In FIG. 1, capacitor 100 includes capacitor walls 110 and vents 120. Thus, when pressure in capacitor 100 increases, vents 120 may open to allow relief of the pressure buildup.

The venting incident will release solvents into the environment such as ethylene glycol. These solvents are not toxic but can act as an irritant. Shutting down the power supply that contains a capacitor that is building up an internal pressure will prevent it from venting.

Modern information technology equipment and telecom equipment also make use of batteries as a back-up feature during loss of the AC utility or to enable portability. Abnormal operating conditions can lead to a buildup of internal pressure, causing the battery cell to rupture. This safety hazard is especially severe with Lithium-Ion batteries, which can cause a fire.

In addition, electrolytic capacitors are present in many power converter technologies. In these technologies, ripple currents can become very high and can lead to increased internal heating and shortening of the life of the capacitor.

Thus, a need exists to monitor and protect conventional power supplies, such as electrolytic capacitors and batteries.

SUMMARY OF THE INVENTION

In view of the foregoing, and other, exemplary problems, drawbacks, and disadvantages of the conventional systems, it is an exemplary feature of the present invention to provide a method of preventing the failure of an energy storage device in a power supply, the method including detecting a package deformation, indicating a gas buildup and a forthcoming failure in a package wall of the energy storage device, detecting a voltage caused by the displacement of the package wall of the energy storage device, determining if the detected voltage is greater than or equal to a voltage threshold to indicate a slight package deformation, issuing a warning if the detected voltage is greater than or equal to the voltage threshold for the slight package deformation, determining if the detected voltage is greater than or equal to a voltage threshold, to indicate a package deformation severe enough that a package breach is imminent, and shutting down the power supply if the detected voltage is determined to be greater than or equal to the package breach voltage threshold.

BRIEF DESCRIPTION OF THE DRAWINGS

The foregoing and other purposes, aspects and advantages will be better understood from the following detailed description of an exemplary embodiment of the invention with reference to the drawings, in which:

FIG. 7 illustrates a storage media (e.g., magnetic data storage diskette 700 or CD-ROM 702) to store the claimed method.

DETAILED DESCRIPTION OF EXEMPLARY EMBODIMENT OF THE INVENTION

Figure 1:
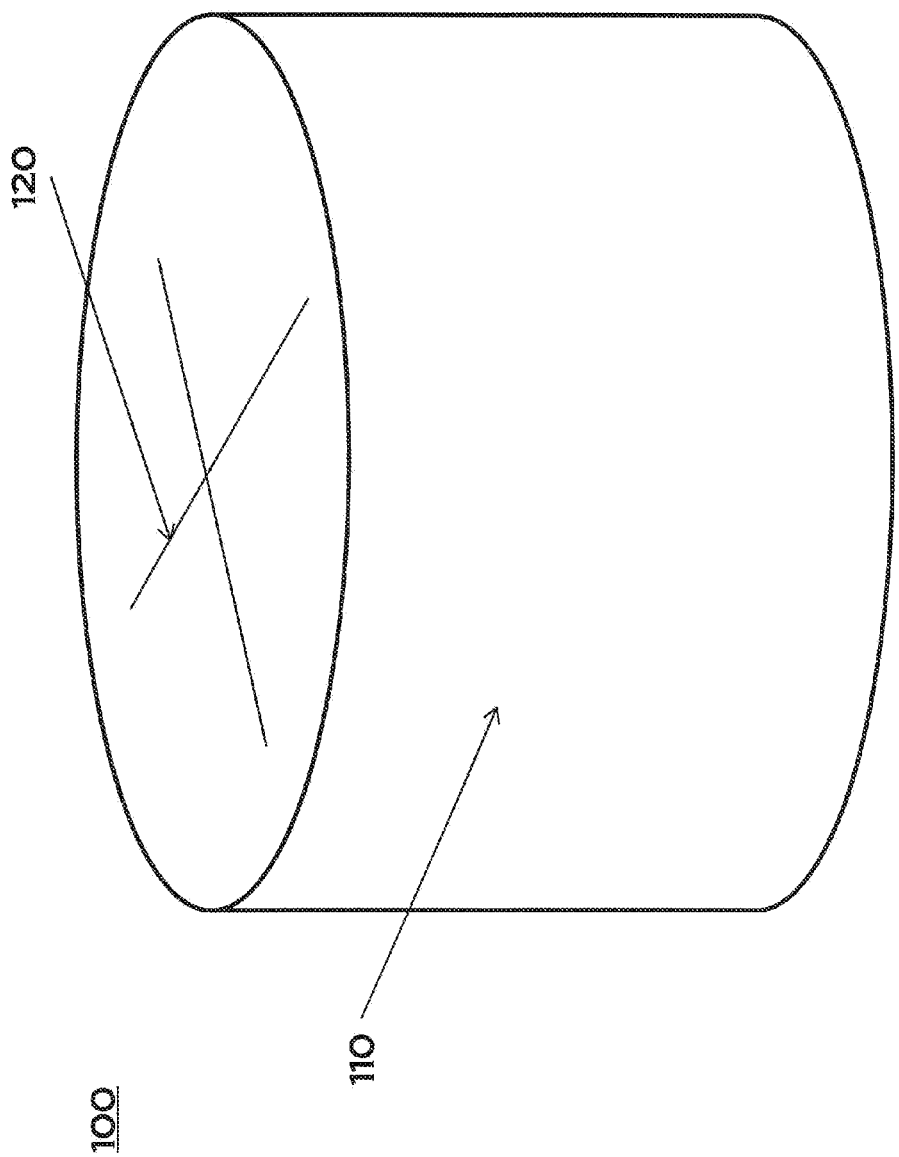
FIG. 1 illustrates a conventional capacitor 100.

Referring now to the drawings, and more particularly to FIGS. 2-7, there are shown exemplary embodiments of the method and structures according to the present invention.

Generally, in the invention, a piezoelectric sensor, which generates an electrical potential in response to applied mechanical stresses is incorporated into an electrolytic capacitor. The piezoelectric sensor can therefore detect a deformation of an energy storage unit which would proceed or indicate a pending failure. The energy storage unit may be a capacitor or lithium ion battery, for example.

The signals from the sensor would exemplarily be used for several purposes. For example, the sensor could detect swelling of a capacitor, indicating a forthcoming failure, so that the power supply can issue a warning for replacement. The sensor could also detect an impending venting incident. This detection could result in immediate shutdown of the power supply. This would prevent the capacitor from venting, and prevent a possible smoke incident.

Figure 2:
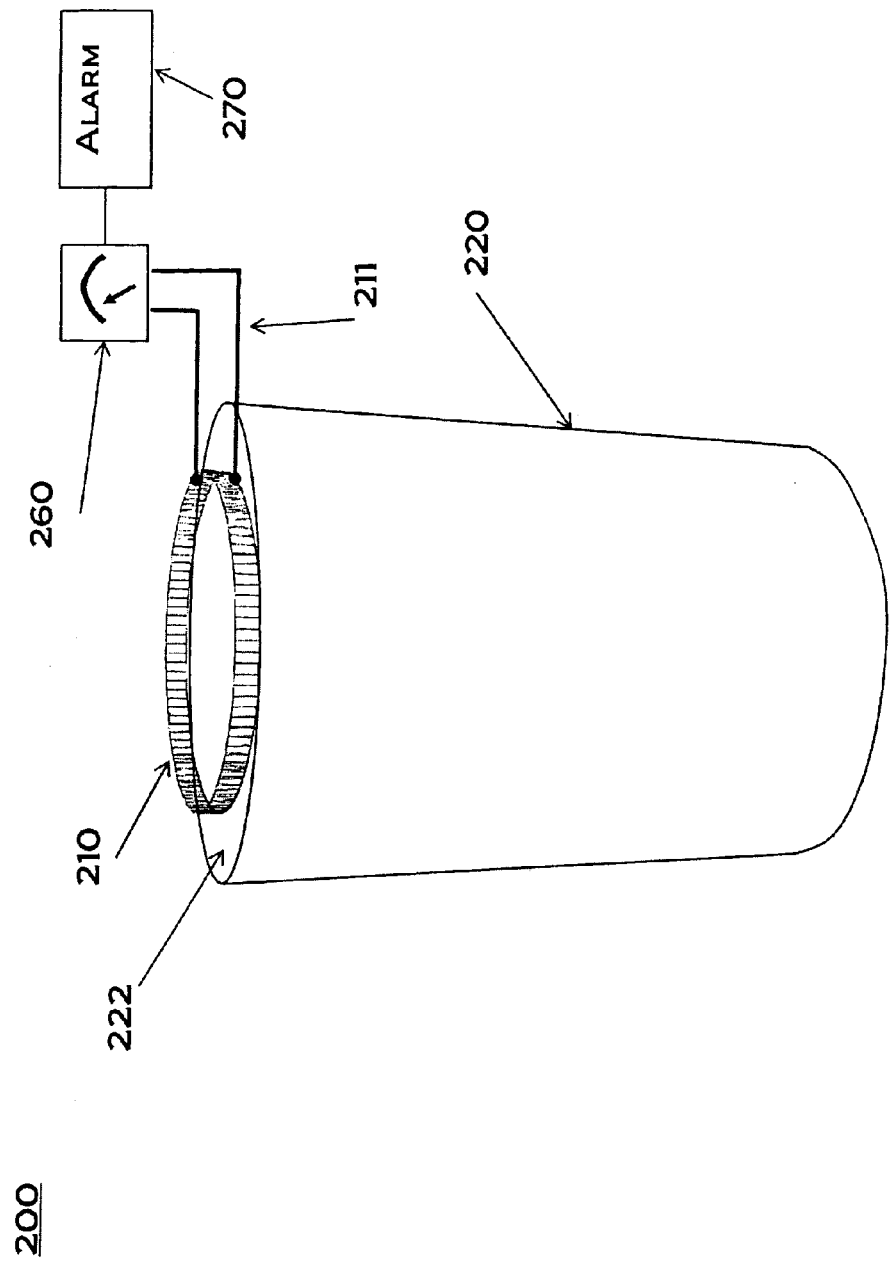
FIG. 2 illustrates an exemplary energy storage device 200 with integrated sensor 210.
Figure 3:
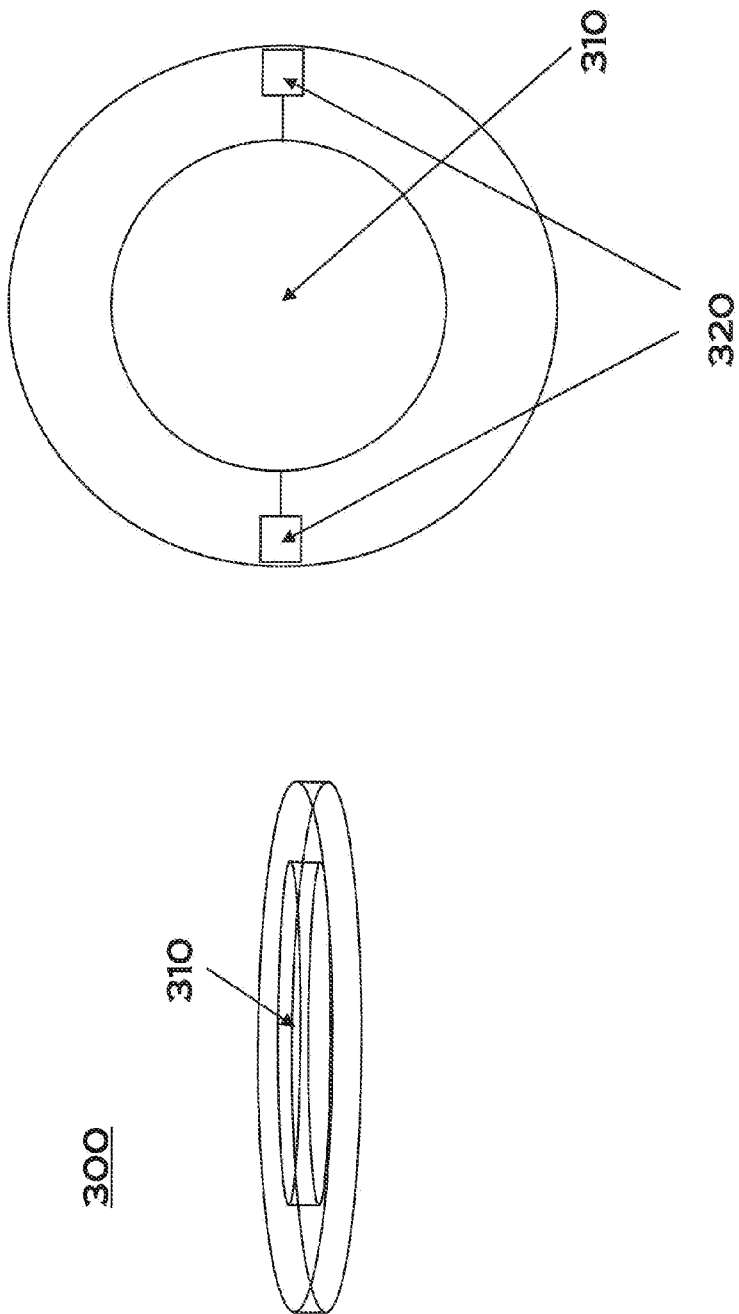
FIGS. 3A and 3B illustrate an exemplary top cap 300 in a side view and a bottom view, respectively.

In an exemplary embodiment, such as the illustration shown in FIG. 2, energy storage device 200 is illustrated. Referring to FIG. 2, energy storage device 200 includes sensor 210 and body 220. Piezoelectric sensor 210 could be incorporated into cap 222 that is secured to the top of capacitor 220. Sensor 220 may exemplarily be a piezoelectric sensor or other sensor configured to detect a deflection of top 222 of body 220. During a buildup of hydrogen gas, top cap 222 of capacitor 220, weakened by the venting structure, would start to deform, which would be detected by piezoelectric sensor 210. Also incorporated into top cap 222 would be electrical leads 211 to sensor 210, which would contact pads on the capacitor.

Sensor 210 may be connected to control unit 260. Control unit 260 may read a deformation indication from sensor 210. Control unit 260 may also be configured to provide a warning or shutdown energy storage device 200. That is, control unit 260 may include an alarm or be associated with alarm 270. In addition, control unit 260 may control a shutdown of energy storage device 200 by, for example, switching off the power being supplied to energy storage device 200.

Alarm 270 may include a display configured to warn a user of an imminent or likely battery venting. Alarm 270 may exemplarily include a speaker to provide an audio warning. Alarm 270 may also be an associated computer program configured to alert the user of the condition.

In an exemplary embodiment, sensor 210 could be incorporated into a cap that is secured to the top of the any energy storage device. For example, the energy storage device may be any battery packaged in a cylindrical cell. This includes Lithium-Ion, Nickel Metal Hydride and Lead-Acid batteries. During a buildup internal pressure, the top of the battery cylinder would start to deform, which would be detected by the piezoelectric sensor in the cap.

FIGS. 3A and 3B are side and bottom views of exemplary top cap 300. Referring to FIGS. 3A and 3B, top cap 300 includes sensor 310 and sensor electrical contacts 320. Similar to sensor 210 of FIG. 2, sensor 310 may also be associated with a control unit (not shown).

In another exemplary embodiment, the piezoelectric sensor may be mounted on the bottom of the capacitor. One advantage of the bottom placement is that the capacitor may maintain the conventional venting capacity at the top portion of the capacitor. In addition, the bottom of the capacitor could be structurally weakened further than the vents, so that the bottom would deform first and be detected by the sensor.

In another exemplary embodiment, the sensor could be incorporated as a plug or diaphragm into the bottom of the capacitor structure. This way, pressure from internal gases would affect the sensor directly. This would have an added advantage of allowing the capacitor to have a tighter than normal seal. The sensor would allow enough pressure to build up during normal operation and would shut down the power supply before destructive pressures are built up. A tighter seal would prevent loss of electrolyte, extending the capacitor's life.

Figure 4:
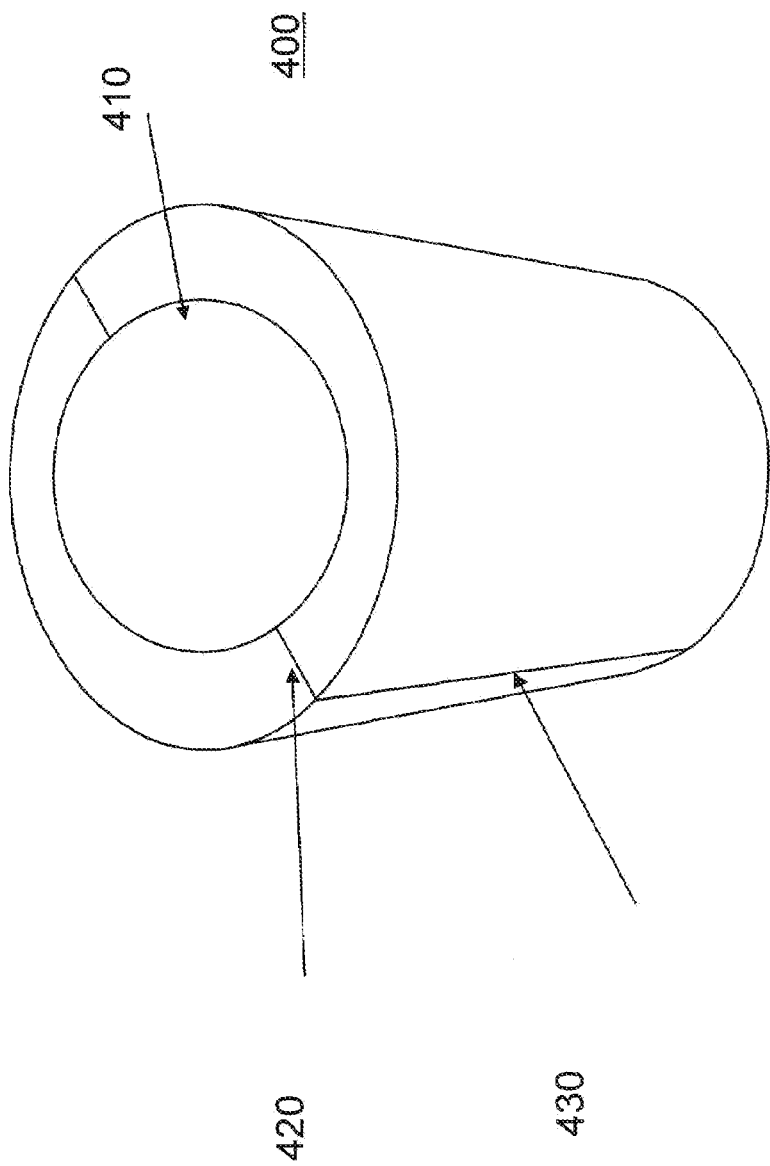
FIG. 4 illustrates exemplary energy storage device 400 with bottom sensor 410.

FIG. 4 is an illustration of exemplary energy storage unit 400 with bottom sensor 410. Referring to FIG. 4, sensor 410 may include sensor leads 430 and sensor electrical contacts 420. Sensor electrical leads 430 may associate sensor 410 with a control unit to monitor an output of sensor 410.

The signals from the sensor may be used to detect swelling of a capacitor, indicating a forthcoming failure, so that the power supply can issue a warning for replacement. In addition, signals from the sensors can detect an impending venting incident. This would result in immediate shutdown of the power supply. This would prevent the capacitor from venting, and prevent a possible smoke incident.

The voltage threshold indicating a forthcoming failure would be lower than the threshold for the impending venting. The sensor voltage would be routed to an Analog-to-Digital converter input of a controlling microprocessor. Therefore, the microprocessor would behave in this manner:

$V_s$=Piezoelectric sensor voltage $V_{t1}$=Voltage threshold detecting slight package deformation, indicating gas buildup and forthcoming failure.

$V_{t2}$=Voltage threshold that would indicate package deformation severe enough that venting would be imminent.

$V_{t2} > V_{t1}$ $V_s < V_{t1}$: No action $V_{t1} < V_s < V_{t2}$: Flag warning, indicating power supply needs to be replaced.

$V_s > V_{t2}$: Shutdown power supply immediately.

Figure 5:
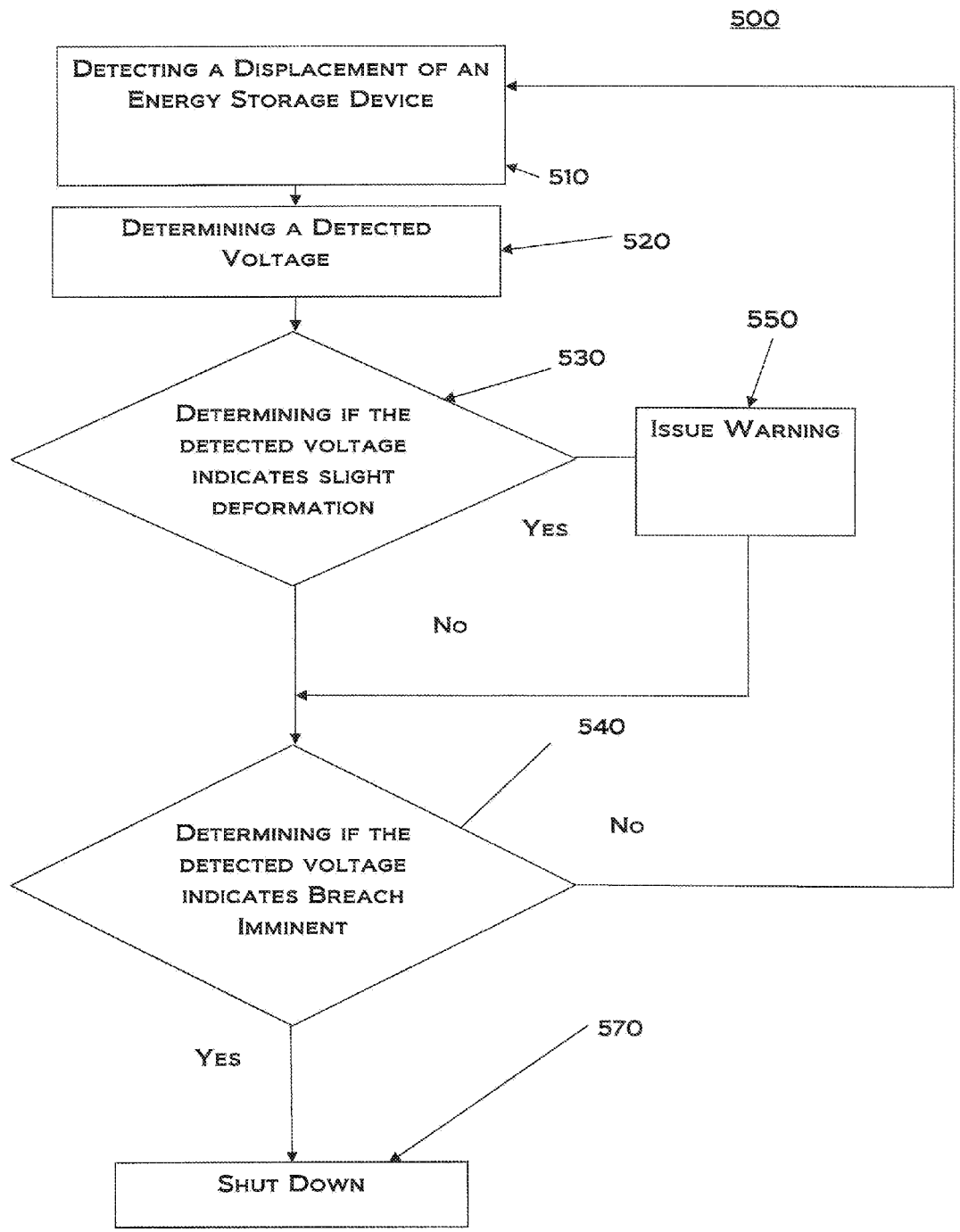
FIG. 5 illustrates exemplary method 500.

FIG. 5 is an illustration of an exemplary method of the present invention as presented in flowchart format. Referring to FIG. 5, Step 510 would detect a displacement of a package wall of an energy storage device. In some embodiments, a piezoelectric sensor may report such a displacement as a voltage. In Step 520, a detection voltage is determined from the displacement determined in Step 510.

In Step 530, method 500 determines if the detected voltage is greater than or equal to a voltage threshold detecting slight package deformation. Such a determination would indicate gas buildup and forthcoming failure of the energy storage unit. If Step 530 does determine the package deformation, then Step 550 would issue a warning through an associated control unit or alarm.

After either of Step 530 or Step 550, Step 540 would determine if the detected voltage is greater than or equal to a voltage threshold that would indicate severe package deformation. Severe package deformation would indicate that package breach would be imminent. If Step 540 does determine that there is severe deformation, then Step 570 would shut down the energy storage unit. In addition, Step 570 may include an associated control unit initiating a shutdown of associated electrical components.

After Step 540, if no severe deformation is detected, method 500 returns to detection step 510.

Although the exemplary embodiment described as a standalone device having control unit 260, the present invention could also be implemented as a device attached to a computer, such that various functions, such as by the control unit, are executed by the controlling computers.

In another aspect, the present invention could be incorporated into a system having a computer such that any of the sensor, alarm, or controller are functions performed by the computer.

Figure 6:
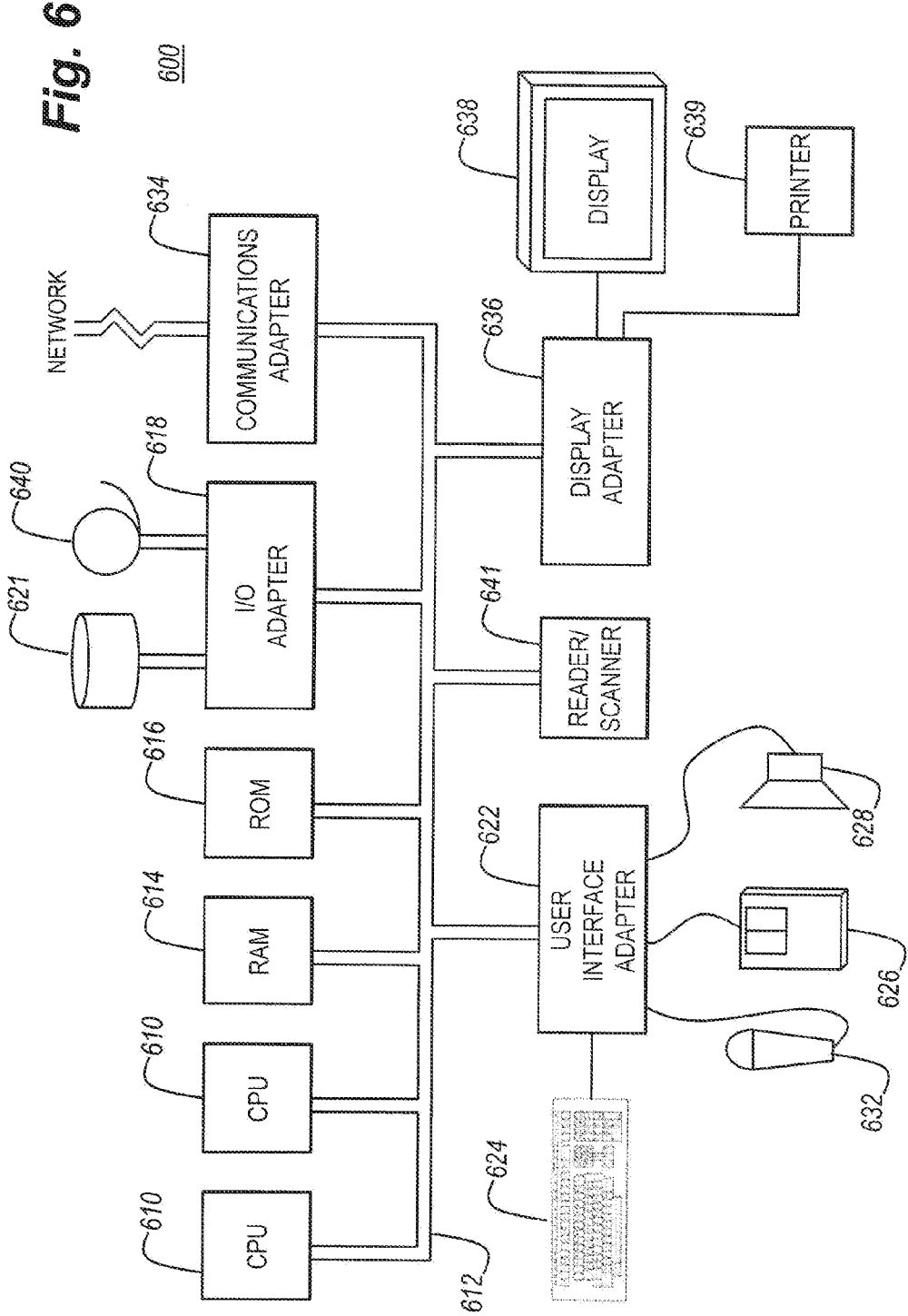
FIG. 6 illustrates a typical hardware configuration which may be used for implementing the computer system and method according to the exemplary aspects of the present invention.

Therefore, referring now to FIG. 6, system 600 illustrates a typical hardware configuration which may be used for implementing the inventive system and method when an external computer is used as incorporating aspects of the present invention. The configuration has at least one processor or central processing unit (CPU) 610. The CPUs 602 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612, along with the seal body 110 of the present invention, as modified to communicate with a computer), a communication adapter 634 for connecting an information handling system to a data processing network, the Internet, and Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating the CPU 610 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 610 and hardware above, to perform the method of the invention.

This signal-bearing media may include, for example, a RAM contained within the CPU 610, as represented by the fast-access storage for example. Alternatively, the instructions may be contained in another signal-bearing media, such as a magnetic data storage diskette 700 or CD-ROM 702, (FIG. 7), directly or indirectly accessible by the CPU 610.

Whether contained in the computer server/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

In the exemplary first embodiment, the instruction would typically be stored in a ROM of control unit 260.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of preventing a failure of an energy storage device in a power supply, the method comprising:
    detecting a package deformation, indicating a gas buildup and a forthcoming failure in a package wall of the energy storage device;
    detecting a voltage caused by the displacement of the package wall of the energy storage device;
    determining if the detected voltage is greater than or equal to a first voltage threshold to indicate a slight package deformation;
    issuing a warning if the detected voltage is greater than or equal to the first voltage threshold for the slight package deformation;
    determining if the detected voltage is greater than or equal to a package breach voltage threshold, to indicate a package deformation severe enough that a package breach is imminent; and
    shutting down the power supply if the detected voltage is determined to be greater than or equal to the package breach voltage threshold.

* * * * *

UNITED STATES PATENT AND TRADEMARK OFFICE
CERTIFICATE OF CORRECTION

| | | |
|---|---|---|
| PATENT NO. | : 7,545,119 B1 | Page 1 of 1 |
| APPLICATION NO. | : 12/184111 | |
| DATED | : June 9, 2009 | |
| INVENTOR(S) | : Patrick Kevin Egan et al. | |

It is certified that error appears in the above-identified patent and that said Letters Patent is hereby corrected as shown below:

On the title page, item (75) is incorrect –

Inventor "Michale Lee Miller" should be --Michael Lee Miller--.

Signed and Sealed this
Nineteenth Day of March, 2013

Teresa Stanek Rea
*Acting Director of the United States Patent and Trademark Office*